(12) United States Patent
Hagiwara et al.

(10) Patent No.: US 9,956,607 B2
(45) Date of Patent: May 1, 2018

(54) METHOD FOR MANUFACTURING ROLLING BEARING UNIT

(71) Applicant: NSK LTD., Tokyo (JP)

(72) Inventors: Nobuyuki Hagiwara, Kanagawa (JP); Toshio Nakamura, Kanagawa (JP); Hiroshi Koyama, Kanagawa (JP); Isao Shintou, Kanagawa (JP); Kazuto Kobayashi, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days. days.

(21) Appl. No.: 15/328,773

(22) PCT Filed: Jul. 24, 2015

(86) PCT No.: PCT/JP2015/071148
§ 371 (c)(1),
(2) Date: Jan. 24, 2017

(87) PCT Pub. No.: WO2016/013668
PCT Pub. Date: Jan. 28, 2016

(65) Prior Publication Data
US 2017/0209914 A1 Jul. 27, 2017

(30) Foreign Application Priority Data

Jul. 25, 2014 (JP) .................................. 2014-152121

(51) Int. Cl.
*F16C 43/04* (2006.01)
*B21K 1/40* (2006.01)
(Continued)

(52) U.S. Cl.
CPC .............. *B21K 1/40* (2013.01); *B60B 27/001* (2013.01); *B60B 27/0078* (2013.01);
(Continued)

(58) Field of Classification Search
CPC .. F16C 43/04; F16C 2220/46; F16C 2326/02; B21K 1/40; B60B 27/001; B60B 27/0078; B60B 2380/14
See application file for complete search history.

(56) References Cited

U.S. PATENT DOCUMENTS 4,893,960 A * 1/1990 Beier .................. B60B 27/0005
403/24
9,180,639 B2 * 11/2015 Ferrero .................. B21K 21/12
(Continued)

FOREIGN PATENT DOCUMENTS

JP 2009292422 A 12/2009
JP 2011-31682 A 2/2011
(Continued)

OTHER PUBLICATIONS

International Search Report and Written Opinion dated Oct. 20, 2015, from the corresponding PCT/JP2015/071148.
(Continued)

*Primary Examiner* — Thomas R Hannon
(74) *Attorney, Agent, or Firm* — Katten Muchin Rosenman LLP

(57) ABSTRACT

Construction is achieved that is capable of preventing the formation of radial streaks in the tip-end surfaces of teeth of hub-side face splines 21. When a swing center distance is taken to be L, a swing angle that is the inclination angle of the center axis of a roll 30 with respect to a main hub body 8 is taken to be θ, the pitch diameter of the hub-side face splines 21 is taken to be $D_h$, the number of teeth of the hub-side face splines 21 is taken to be $N_h$, and the number of teeth of a processing surface 31 of the roll 30 is taken to be $N_r$, the position relationship of the main hub body 8 and the roll 30, or in other words, at least one of the swing center distance L, the swing angle θ, and the pitch circle diameter $D_h$ is regulated so that the relationship $Nh/Nr = \cos θ + (2L/D_h)·\sin θ$ is satisfied.

4 Claims, 7 Drawing Sheets

(51) Int. Cl.
*F16C 19/18* (2006.01)
*B60B 27/00* (2006.01)

(52) U.S. Cl.
CPC .......... *F16C 19/186* (2013.01); *F16C 43/04* (2013.01); *B60B 2380/14* (2013.01); *F16C 2220/46* (2013.01); *F16C 2326/02* (2013.01)

(56) References Cited

U.S. PATENT DOCUMENTS

| | | |
|---|---|---|
| 9,512,883 B2* | 12/2016 | Ogata ................. B60B 27/0005 |
| 2011/0061238 A1 | 3/2011 | Sera et al. |
| 2012/0267944 A1 | 10/2012 | Toda et al. |
| 2013/0181504 A1 | 7/2013 | Ferrero et al. |
| 2014/0100044 A1 | 4/2014 | Kimura et al. |
| 2016/0263940 A1* | 9/2016 | Hagiwara .............. B21D 53/12 |

FOREIGN PATENT DOCUMENTS

| | | |
|---|---|---|
| JP | 2012-223803 A | 11/2012 |
| WO | 2009139137 A1 | 11/2009 |

OTHER PUBLICATIONS

The extended European Search Report dated Feb. 13, 2018, from the corresponding European Application No. 15824626.4.

\* cited by examiner

METHOD FOR MANUFACTURING ROLLING BEARING UNIT

TECHNICAL FIELD

The present invention relates to a method for manufacturing a rolling bearing unit such as a rolling bearing unit for supporting wheels of a wheel-drive bearing unit that is combined together with a universal joint.

BACKGROUND ART

FIG. 5 illustrates an example of conventional construction of a wheel-drive bearing unit in which a rolling bearing unit for wheel support, which is one kind of a rolling bearing unit that is the object of the present invention, is assembled. A wheel-drive bearing unit includes a wheel-support bearing unit 1 and a universal joint outer ring 2. The wheel-support bearing unit 1 includes an outer ring 3, a hub 4, and plural rolling bodies 5.

A stationary-side flange 6 is provided around the outer-circumferential surface of the outer ring 3, and double-row outer-ring raceways 7a, 7b are provided around the inner-circumferential surface of the outer ring 3. The hub 4 includes a main hub body 8 and an inner ring 9. A rotating-side flange 10 is provided around a portion near the end section on one side in the axial direction of the outer-circumferential surface of the main hub body 8, an inner-ring raceway 11a on the one side in the axial direction is provided around the middle section in the axial direction of the outer-circumferential direction of the main hub body 8, and a small-diameter stepped section 12 is provided on the other end section in the axial direction of the outer-circumferential surface of the main hub body 8. Here, the "one side" in the axial direction is the outside (left side in FIG. 5) in the width direction of a vehicle when assembled in a vehicle. Conversely, the center side (right side in FIG. 5) in the width direction of a vehicle when assembled in a vehicle is called the "other side".

A center hole 13 is provided in the center section of the main hub body 8. A small-diameter section 14 is provided on the one end section in the axial direction of the center hole 13. A rod section 16 of a bolt 15, which is a connecting member for connecting the wheel-support rolling bearing unit 1 and the universal joint outer ring 2, is inserted through the small-diameter section 14 of the center hole 13 by way of a specified guiding space. An inner-ring raceway lib on the other side in the axial direction is provided around the outer-circumferential surface of the inner ring 9, and the inner ring 9 fits around the small-diameter stepped section 12 of the main hub body 8 with an interference fit. The rolling bodies 5 are arranged between the outer-ring raceways 7a, 7b and the inner-ring raceways 11a, 11b with a plurality of rolling bodies 5 rotatably arranged in each row. In the example in FIG. 5, balls are used as the rolling bodies 5, however, instead of balls it is also possible to use conical rollers as the rolling bodies 5.

A crimped section 20 is provided on the other end section in the axial direction of the main hub body 8 by causing a protruding portion of a cylindrical section 19 of the other end section in the axial direction of the main hub body 8 that protrudes toward the other side in the axial direction from an opening on the other side in the axial direction of the inner ring 9 to plastically deform outward in the radial direction. The inner ring 9 is fastened to the main hub body 8 by constraining the other end surface in the axial direction of the inner ring 9 with the one end surface in the axial direction of the crimped section 20, and this applies a proper preload to the rolling bodies 5. Hub-side face splines 21 (uneven surface in the circumferential direction) are formed around the entire circumference on the other end surface in the axial direction of the crimped section 20. In the example in FIG. 5, the tip surfaces of the teeth of the hub-side splines 21 are flat surfaces that are at a right angle with respect to the center axis of the main hub body 8.

The universal joint outer ring 2 includes a cup-shaped mouth section 22, an end wall section 23 that is a bottom section of the mouth section 22, and a cylindrical-shaped shaft section 24 that extends in one direction in the axial direction from the center section of the end wall section 23. A center hole of the shaft section 24 is a threaded hole 25. Joint-side face splines 26 (uneven surface in the circumferential direction) are formed around the entire circumference of a portion near the outside in the radial direction of the one end surface in the axial direction of the end wall section 23. In the example in FIG. 5, the tip surfaces of the teeth of the joint-side face splines 26 are flat surfaces that are at a right angle with respect to the center axis of the universal joint outer ring 2.

With the center axes of the main hub body 8 and the universal joint outer ring 2 coinciding with each other, the hub-side face splines 21 engage with the joint-side face splines 26, which makes it possible to transmit torque between the main hub body 8 and the universal joint outer ring 2. Together with inserting the rod section 16 of the bolt 15 from the one side in the axial direction through the small-diameter section 14 of the center hole 13 of the main hub body 8, a male threaded section 17 that is provided on a tip-end section of the rod section is screwed into the threaded hole 25 and further tightened. With this kind of construction, the main hub body 8 and the universal joint outer ring 2 are connected and fastened together with the main hub body 8 being held between a head section 18 of the bolt 15 and the universal joint outer ring 2.

When assembling a wheel-drive bearing unit such as described above into a vehicle, the stationary-side flange 6 of the outer ring 3 is connected and fastened to a suspension, and a wheel (drive wheel) and rotating member such as a disk for a brake are supported by and fastened to the rotating-side flange 10 of the main hub body 8. The tip-end section of a drive shaft (not illustrated in FIG. 5) that is rotated and driven by an engine by way of a transmission fits on the inside of a universal-joint inner ring 27 that is arranged on the inside of the universal-joint outer ring 2 with a spline fit. When an automobile is moving, the rotation of the universal-joint inner ring 27 is transmitted to the universal-joint outer ring 2 and main hub unit 8 by way of plural balls 28, and rotates and drives a wheel.

When assembling a wheel-support rolling bearing unit 1 of a wheel-drive bearing unit such as described above, first, together with arranging the outer ring 3 around the circumference of the main hub body 8, rolling bodies 5 are provided between the outer-ring raceway 7a on the one side in the axial direction of the outer-ring raceways 7a, 7b and the inner-ring raceway 11a on the one side in the axial direction, while being held by a retainer 29a on the one side in the axial direction. Next, rolling bodies 5 are placed around the circumference of the inner-ring raceway 11b on the other side in the axial direction that was formed around the outer-circumferential surface of the inner ring 9 while being held by a retainer 29b on the other side in the axial direction, and in this state, the inner ring 9 is fitted with an interference fit around the small-diameter stepped section 12 that was formed on the other end section in the axial direction of the main hub body 8. Together with this outer fitting work, the rolling surfaces of the rolling bodies 5 in the row on the other side in the axial direction that are held by the retainer 29b on the other side in the axial direction are brought into contact with the outer-ring raceway 7b on the other side in the axial direction that was formed around the inner-circumferential surface of a portion near the other end in the axial direction of the outer ring 3. After that, the portion of the cylindrical section 19 of the other end section in the axial direction of the main hub body 8 that protrudes toward the other side in the axial direction from the opening on the other side in the axial direction of the inner ring 9 is plastically deformed outward in the radial direction to form a crimped section 20, and by constraining in the axial direction the other end surface in the axial direction of the inner ring 9 by the one end surface in the axial direction of the crimped section 20, the inner ring 9 is fastened to the main hub body 8.

As illustrated in FIG. 6, by performing orbital forging on the other end surface in the axial direction of the crimped section 20 of the assembled wheel-support rolling bearing unit 1 using a roll 30 having a center axis that is inclined with respect to the center axis of the main hub unit 8, the hub-side face splines 21 are formed on the other end surface in the axial direction of the crimped section 20. Plural teeth that are uniformly spaced in the circumferential direction are provided on the processing surface 31, which is the tip-end surface (bottom-end surface) of the roll 30. With the processing surface 31 of the roll 30 pressed against the other end surface in the axial direction of the crimped section 20, the roll 30 is made to rotate (revolve) around the center axis of the main hub body 8, and due to the engagement between the processing surface 31 of the roll 30 and the other end surface in the axial direction of the crimped section 20, the roll 30 rotates around the center axis of the roll 30 (rotates around its own axis). From this kind of orbital forging, the hub-side face splines 21 (uneven surface in the circumferential direction) are formed on the other end surface in the axial direction of the crimped section 20.

When the hub-side face splines 21 are formed on the other end surface in the axial direction of the crimped section 20 by orbital forging, as illustrated in FIG. 6, there is a possibility that one or more radial streaks (minute concave grooves) 32 will be formed in the tip-end surfaces of the teeth of the hub-side face splines 21. In other words, when performing orbital forging, a difference may occur between the pitch in the circumferential direction of the teeth of the hub-side face splines 21 that are to be formed on the other end surface in the axial direction of the crimped section 20 and the pitch in the circumferential direction of the teeth that are formed on the processing surface 31 of the roll 30. When this difference is large, each time the roll 30 rotates around the center axis of the main hub body 8, portions of the other end surface in the axial direction of the crimped section 20 that are pressed by the teeth that are formed on the processing surface 31 of the roll 30 are moved and shifted in the circumferential direction. Then, as the same portions of the tip-end surfaces of the teeth of the hub-side face splines 21 are repeatedly pressed by the teeth of the processing surface 31 of the roll 30, the depths of the streaks 32 that are formed in the tip-end surfaces of the teeth becomes deeper. As the depths of the streaks 32 become deeper, it becomes easy for parts of the other end surface in the axial direction of the crimped section 20 to become damaged or to peel away. When the other end surface in the axial direction of the crimped section 20 becomes damaged, there is a possibility that the engaged state between the hub-side face splines 21 and the joint-side face splines 26 will become bad, and that metal powder that is generated will get inside the inner space of the wheel-support rolling bearing unit 1, causing the life of the wheel-support rolling bearing unit 1 to decrease.

WO2009/1399137 (A1) discloses a method for forming hub-side face splines on the other end surface in the axial direction of this crimped section at the same time that the crimped section is formed. However, in WO2009/139137 (A1) no study has been performed for measures to prevent the formation of radial streaks in the tip-end surfaces of the teeth of the hub-side face splines when forming the hub-side face splines.

RELATED LITERATURE

Patent Literature

[Patent Literature 1] JP2009292422 (A)
[Patent Literature 2] WO2009/139137 (A1)

SUMMARY OF INVENTION

Problem to be Solved by Invention

An object of the present invention is to provide a manufacturing method for a rolling bearing unit that is capable of preventing the formation of radial streaks in the tip-end surfaces of teeth of hub-side face splines.

Means for Solving Problems

The rolling bearing unit that is the object of the manufacturing method of the present invention includes a main hub body and an inner ring. The main hub body has an inner-ring raceway on one side in the axial direction of the rolling bearing unit that is provided around the outer-circumferential surface of the middle section in the axial direction of the main hub body, a cylindrical section that is provided on a portion near the other end in the axial direction of the main hub body, and a crimped section that is provided on the end section on the other side in the axial direction of the main hub body and extends outward in the radial direction from the end section on the other side in the axial direction of the cylindrical section. The inner ring has an inner-ring raceway on the other side in the axial direction around the outer-circumferential surface of the inner ring, and fits around the cylindrical section. The crimped section has a surface on the one end in the axial direction that constrains a surface on the other end in the axial direction of the inner ring, and a surface on the other end in the axial direction on which hub-side face splines (uneven surface in the circumferential direction) are provided.

In the manufacturing method for a rolling bearing unit of the present invention, hub-side face splines are formed on the end surface of the other side in the axial direction of the crimped section by using a roll having a center axis that is inclined with respect to the center axis of the main hub body and a processing surface provided with plural teeth, and with the processing surface of the roll pressed against the surface of the other end in the axial direction of the crimped section, causing the roll to rotate around the center axis of the main hub body, and causing the roll to rotate around the center axis of the roll due to engagement between the processing surface of the roll and the end surface of the other side in the axial direction of the crimped section.

Particularly, in the manufacturing method for a rolling bearing unit of the present invention, when causing the roll to rotate center around the center axis of the main hub body with the processing surface of the roll pressed against the surface of the other end in the axial direction of the crimped section, spacing of the teeth that are formed on the processing surface at a location in the radial direction of a portion of the processing surface of the roll where the tip end of one tooth of the teeth formed on the processing surface of the roll first comes in contact with the surface of the other end in the axial direction of the crimped section, and spacing of teeth of the hub-side face splines at a location in the radial direction of a portion of the surface of the other end in the axial direction of the crimped section where the other end surface in the axial direction of the crimped section first comes in contact with the tip end of the one tooth of the teeth formed on the processing surface of the roll are made to coincide.

When embodying the present invention as described above, or more specifically, in a state in which the processing surface of the roll is pressed against the surface of the other end in the axial direction of the crimped section, when a swing center distance that is the distance in the axial direction of the main hub body between an intersecting point of the center axis of the main hub body and the center axis of the roll and an imaginary plane that includes the surface of the other end in the axial direction of the crimped section is taken to be L;

a swing angle that is the inclination angle of the center axis of the roll with respect to the center axis of the main hub unit is taken to be θ;

a diameter of an imaginary circle (pitch circle of the hub-side face splines) the center of which is the center axis of the main hub body and the radius of which is the distance between the center axis of the main hub body and the location in the radial direction of the portion of the surface of the other end in the axial direction of the crimped section where the surface of the other end in the axial direction of the crimped section first comes in contact with the tip end of the one tooth of the plural teeth formed on the processing surface of the roll is taken to be $D_h$;

the number of teeth of the hub-side face splines is taken to be $N_h$; and the number of teeth formed on the processing surface of the roll is taken to be $N_r$;

the positional relationship of the main hub body and the roll, or in other words at least one of the swing center distance L, the swing angle θ, and the pitch circle diameter $D_h$, is regulated so that the relationship $N_r/N_h = \cos θ + (2L/D_h) \cdot \sin θ$ is satisfied.

Alternatively, in a state in which the processing surface of the roll is pressed against the surface of the other end in the axial direction of the crimped section, after one of a swing center distance L that is the distance in the axial direction of the main hub body between an intersecting point of the center axis of the main hub body and the center axis of the roll and an imaginary plane that includes the surface of the other end in the axial direction of the crimped section, and a swing angle θ that is the inclination angle of the center axis of the roll with respect to the center axis of the main hub body has been set to an arbitrary value;

a relationship between the value of the other of the swing center distance L and the swing angle θ, and the difference between the spacing of the teeth that are formed on the processing surface of the roll, and the spacing of the teeth of the hub-side face splines is found in order to provide a specified shape to the hub-side face splines, or in other words in order that specified values are employed for a pitch circle diameter $D_h$ of an imaginary circle the center of which is the center axis of the main hub body and the radius of which is the distance between the center axis of the main hub body and the location in the radial direction of the portion of the surface of the other end in the axial direction of the crimped section where the surface of the other end in the axial direction of the crimped section first comes in contact with the tip end of the one tooth of the teeth formed on the processing surface of the roll, and the number of teeth $N_h$ of the hub-side face splines, and from the relationship, the difference is set so as to be 0, or in other words the value of the other of the swing center distance L and the swing angle θ is determined so that the spacing of the teeth that are formed on the processing surface of the roll, and the spacing of the teeth of the hub-side face splines are made to coincide with each other.

Effect of Invention

The manufacturing method of a rolling bearing unit of the present invention is such that when performing orbital forging on the other end surface in the axial direction of the crimped section, spacing of the teeth that are formed on the processing surface of the roll at a location in the radial direction of a portion of the processing surface of the roll where the tip end of one tooth of the plural teeth formed on the processing surface of the roll first comes in contact with the other end surface in the axial direction of the crimped section, and spacing of the teeth of the hub-side face splines at a location in the radial direction of a portion of the other end surface in the axial direction of the crimped section where the other end surface in the axial direction of the crimped section first comes in contact with the tip end of one tooth of the plural teeth formed on the processing surface of the roll are made to coincide.

By doing so, the formation of radial streaks in the tip-end surfaces of each of the teeth of the hub-side face splines is prevented. As a result, together with being possible to prevent damage or peeling of the other end surface in the axial direction of the crimped section, and properly maintain an engaged state between the hub-side face splines and the opposing-side face splines over a long period of time, it is possible to sufficiently maintain the life of the rolling bearing unit.

MODES FOR CARRYING OUT INVENTION

First Example

Figure 1:
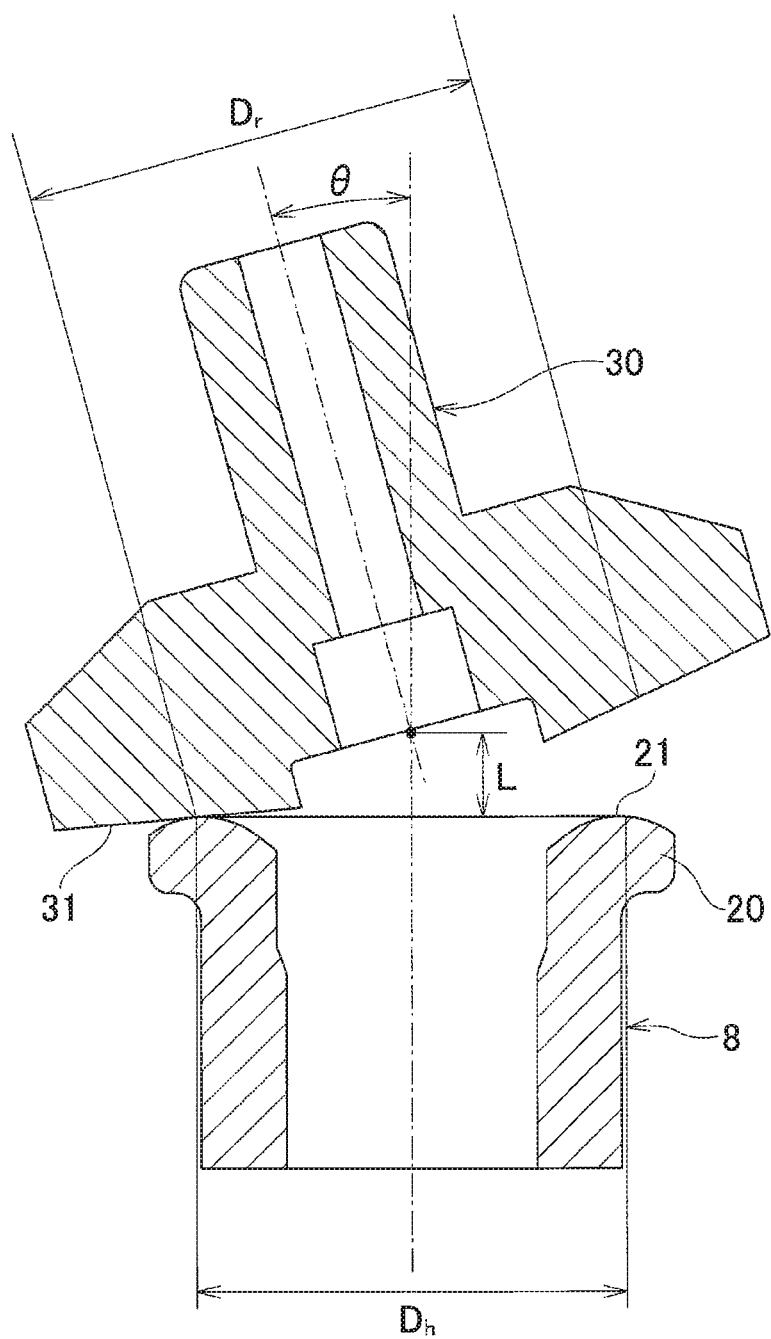
FIG. 1 is a cross-sectional view illustrating an example of a manufacturing method for a rolling bearing unit of the present invention.

A first example of an embodiment of the present invention is explained using FIG. 1. A feature of the present invention, including this example, is the prevention of radial streaks 32 (refer to FIG. 7) that are formed in the tip-end surfaces of teeth of hub-side face splines 21 due to orbital forging when forming the hub-side face splines 21 by performing orbital forging on a surface of the other end in the axial direction of a crimped section 20. The procedure for manufacturing each of the members of a rolling bearing unit 1 (refer to FIG. 5) by performing a plastic working process such as a forging process and the like, and performing a cutting process such as turning and the like, and a finishing process such as polishing on a metal material, is the same as in a conventionally known manufacturing method for a rolling bearing unit.

Figure 5:
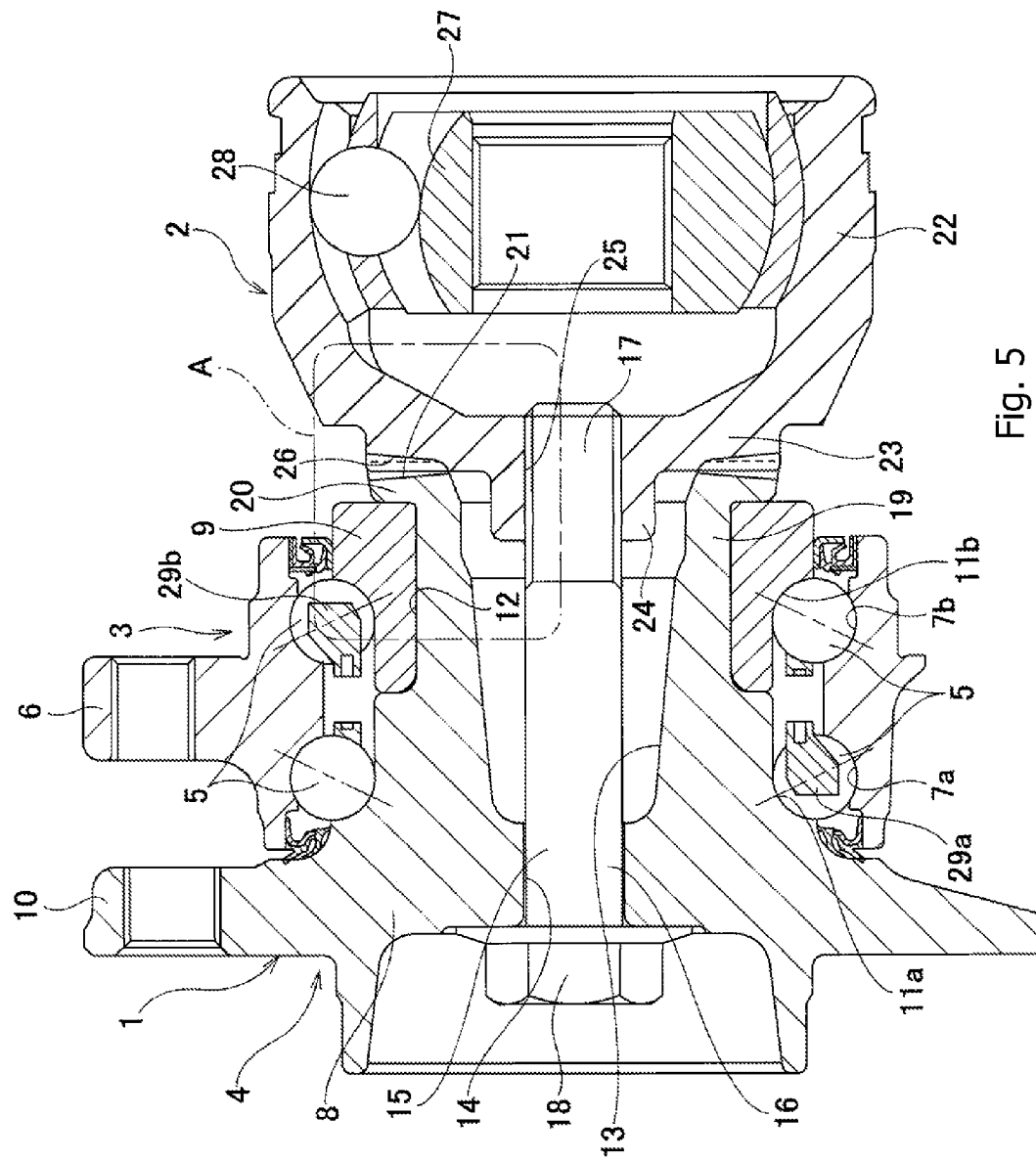
FIG. 5 is a cross-sectional view of an example of conventional construction of a wheel-drive bearing unit in which a wheel-support bearing unit, which is one kind of a rolling bearing that is the object of the present invention, is assembled.
Figure 6:
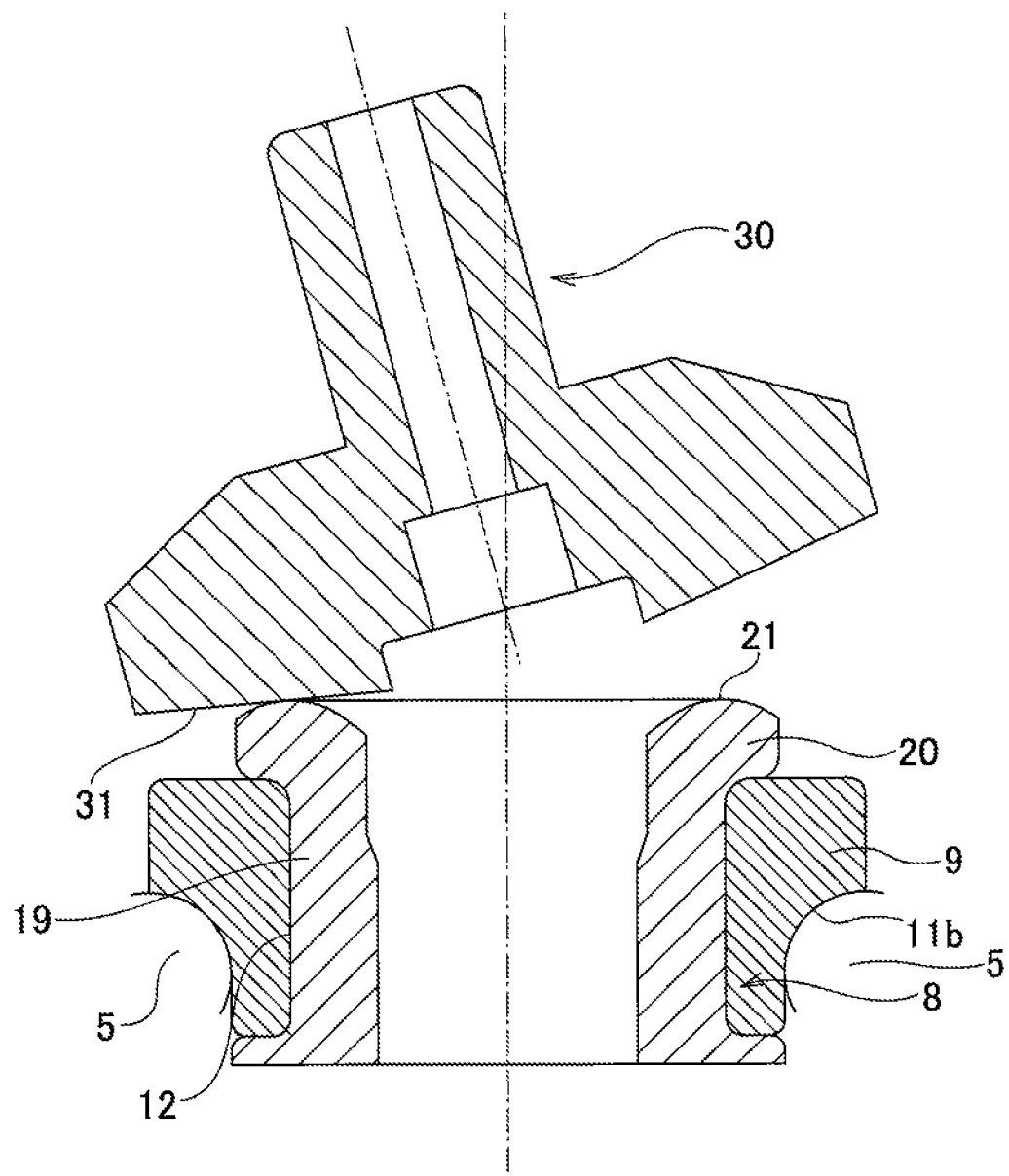
FIG. 6 is cross-sectional view illustrating an example of a conventional manufacturing method for a rolling bearing unit.

A wheel-support rolling bearing unit 1, which is one example of a rolling bearing unit that is the object of the manufacturing method of the present invention, includes a main hub unit 8 and an inner ring 9 (refer to FIG. 5). The main hub unit 8 includes an inner-ring raceway 11a on one side in the axial direction that is provided around the outer-circumferential surface of the middle section in the axial direction of the main hub unit 8, a cylindrical section 19 that is provided in a portion near the other end in the axial direction of the main hub unit 8, and a crimped section 20 that is provided on the other end in the axial direction of the main hub unit 8 and extends outward in the radial direction of the other end section in the axial direction of the cylindrical section 19. The inner ring 9 has an inner-ring raceway 1ib around the outer-circumferential surface of the inner ring 9, and is fitted around the cylindrical section 19. The crimped section 20 has a surface on the one end in the axial direction that constrains the surface of the other end in the axial direction of the inner ring 9, and a surface on the other end in the axial direction on which hub-side face splines 21 (uneven surface in the circumferential direction) are provided.

When assembling the wheel-support rolling bearing 1, first, an outer ring 3 is arranged around the circumference of the main hub unit 8, and a plurality of rolling bodies 5 are arranged between an outer-ring raceway 7a on the one side in the axial direction and an inner-ring raceway 11a on the one side in the axial direction, and held by a retainer 29a on the one side in the axial direction. Next, rolling bodies 5 are arranged around the circumference of the inner-ring raceway 11b on the other side in the axial direction that is formed around the outer-circumferential surface of the inner ring 9 and held by a retainer 29b on the other side in the axial direction; and in this state, the inner ring 9 is fitted with an interference fit around a small-diameter stepped section 12 that is formed by a cylindrical section 19 that extends from the middle section in the axial direction of the main hub body 8 to the other side in the axial direction. Together with this outer fitting work, the rolling surfaces of the rolling bodies 5 in the row on the other side in the axial direction are brought into contact with an outer-ring raceway 7b on the other side in the axial direction that is formed around the inner-circumferential surface of a portion near the other end in the axial direction of the outer ring 3. After that, in the state before forming the crimped section 20, of the cylindrical section 19 that extends in the axial direction from a portion near the other end in the axial direction of the main hub body 8 to the other end section in the axial direction, a portion that protrudes toward the other side in the axial direction from an opening on the other side in the axial direction of the inner ring 9 is plastically deformed outward in the radial direction to form a crimped section 20 on the other end section in the axial direction of the main hub body 8. The inner ring 9 is fastened to the main hub body 8 by constraining the other end surface in the axial direction of the inner ring 9 in the axial direction by the one end surface in the axial direction of the crimped section 20.

Hub-side face splines 21 are formed by using a roll 30 having a center axis that is inclined with respect to the center axis of the main hub body 8 to perform orbital forging on the other end surface in the axial direction of the crimped section 20 of the wheel-support rolling bearing unit 1 that is assembled in this way. More specifically, with the processing surface of the roll 30 pressed against the other end surface in the axial direction of the crimped section 20, hub-side face splines 21 are formed by causing the roll 30 to rotate around the center axis of the main hub body 8, and by causing the roll 30 to rotate around the center axis of the roll 30 due to the engagement between the processing surface of the roll 30 and the other end surface in the axial direction of the crimped section 20.

In this embodiment, when performing orbital forging on the other end surface in the axial direction of the crimped section 20, the spacing (pitch in the circumferential direction of the teeth that are formed on the processing surface) $P_r$ of the teeth that are formed on the processing surface 31 at a location in the radial direction of a portion of the processing surface 31 of the roll 30 where the tip end of one tooth of the plural teeth that are formed on the processing surface 31 of the roll 30 first comes in contact with the other end surface in the axial direction of the crimpled section 20, and the spacing (pitch in the circumferential direction of the hub-side face splines 21 that are to be formed on the other end surface in the axial direction of the crimped section 20) $P_h$ of the teeth of the hub-side face splines 21 at a location in the radial direction of a portion of the other end surface in the axial direction of the crimped section 20 where the other end surface in the axial direction of the crimped section 20 first comes in contact with the tip end of one tooth of the plural teeth formed on the processing surface 31 of the roll 30 are made to coincide. In other words, the difference $\Delta P$ ($=P_r-P_h$) between the pitch $P_r$ in the circumferential direction of the teeth formed on the processing surface 31 and the pitch $P_h$ in the circumferential direction of the hub-side face splines 21 that are to be formed on the other end surface in the axial direction of the crimped section 20 is made to be 0.

Therefore, more specifically, the swing center distance L that is the distance in the axial direction of the main hub body 8 between the intersecting point of the center axis of the main hub body 8 and the center axis of the roll 30 in a state in which the processing surface 31 of the roll 30 is pressed against the other end surface in the axial direction of the crimped section 20 and an imaginary plane that includes the other end surface in the axial direction of the crimped section 20, and the swing angle θ that is the inclination angle of the center axis of the roll 30 with respect to the center axis of the main hub body 8 are regulated to as to satisfy the relationship given in Expression (1).

$$N_r/N_h = \cos\theta + (2L/D_h)\cdot\sin\theta \quad (1)$$

In Expression (1), $D_h$ indicates the diameter of an imaginary circle (pitch circle diameter of the hub-side face splines 21) the center of which is taken to be the center axis of the main hub body 8, and the radius of which is taken to be the distance between the center axis of the main hub body 8 and the location in the radial direction of the portion of the other end surface in the axial direction of the crimped section 20 where the other end surface in the axial direction of the crimped section 20 first comes in contact with the tip end of one tooth of the plural teeth that are formed on the processing surface 31 of the roll 30. Moreover, $N_h$ indicates the number of teeth of the hub-side face splines 21, and $N_r$ indicates the number of teeth that are formed on the processing surface 31 of the roll 30.

The reason for matching the pitch $P_r$ in the circumferential direction of the teeth that are formed on the processing surface 31 with the pitch $P_h$ in the circumferential direction of the hub-side face splines 21 that are to be formed on the other end surface in the axial direction of the crimped section 20 by satisfying the relationship of this kind of Expression (1) is as described below.

The pitch $P_r$ in the circumferential direction of the teeth that are formed on the processing surface 31 of the roll 30 is expressed by Expression (2), and the pitch $P_h$ in the circumferential direction of the hub-side face splines 21 that are to be formed on the other end surface in the axial direction of the crimped section 20 is expressed by the Expression (3).

$$P_r = \pi D_r/N_r \quad (2)$$

$$Ph = \pi D_h/N_h \quad (3)$$

In Expression (2), $D_r$ indicates the diameter of an imaginary circle (pitch circle diameter of teeth that are formed on the processing surface 31) the center of which is taken to be the center axis of the roll 30, and the radius of which is taken to be the distance between the center axis of the roll 30 and the location in the axial direction of the portion of the processing surface 31 of the roll 30 where the tip end of one tooth of the plural teeth that are formed on the processing surface 31 first comes in contact with the other end surface in the axial direction of the crimped section 20. From Expression (2) and Expression (3), the pitch difference ΔP ($=P_r-P_\pi$) can expressed as in Expression (4).

$$\Delta P = \pi(D_r/N_r - D_h/N_h) \quad (4)$$

The relationship between the pitch circle diameter $D_h$ of the hub-side face splines 21 and the pitch circle diameter $D_r$ of the teeth that are formed on the processing surface 31 of the roll 30, can be expressed by Expression (5) as can be clearly seen from FIG. 1.

$$D_r/2 = (D_h/2 + L\cdot\tan\theta)\cdot\cos\theta \quad (5)$$

By substituting Expression (5) into Expression (4), an Expression (6) is obtained.

$$\Delta P = \pi\cdot\{(D_h/N_r)\cdot\cos\theta + (2L/N_r)\cdot\sin\theta - D_h/N_h\} \quad (6)$$

As can be clearly seen from Expression (6), the pitch difference ΔP changes as the swing center distance L or the swing angle θ changes. Here, when the pitch difference ΔP is taken to be ΔP=0, Expression (4) can be expressed by Expression (7).

$$D_r/N_r = D_h/N_h \quad (7)$$

From Expression (7) and Expression (5), it is possible to derive Expression (1).

In the manufacturing method for a rolling bearing unit of the present invention, when providing hub-side face splines 21 on the other end surface in the axial direction of the crimped section 20 by performing orbital forging, the spacing (pitch in the circumferential direction of the hub-side face splines 21 that are to be formed on the other end surface in the axial direction of the crimped section 20) $P_h$ of the teeth of the hub-side face splines 21 at a location in the radial direction of a portion of the other end surface in the axial direction of the crimped section 20 where the other end surface in the axial direction of the crimped section 20 first comes in contact with the tip end of one tooth of the plural teeth that are formed on the processing surface 31 of the roll 30, and the spacing (pitch in the circumferential direction of the teeth that are formed on the processing surface 31 of the roll 30) $P_r$ of the teeth that are formed on the processing surface 31 at a location in the radial direction of a portion of the processing surface 31 of the roll 30 where the tip end of one tooth of the plural teeth that are formed on the processing surface 31 of the roll 30 first comes in contact with the other end surface in the axial direction of the crimped section 20 are made to coincide ($P_h=P_r$).

Figure 7:
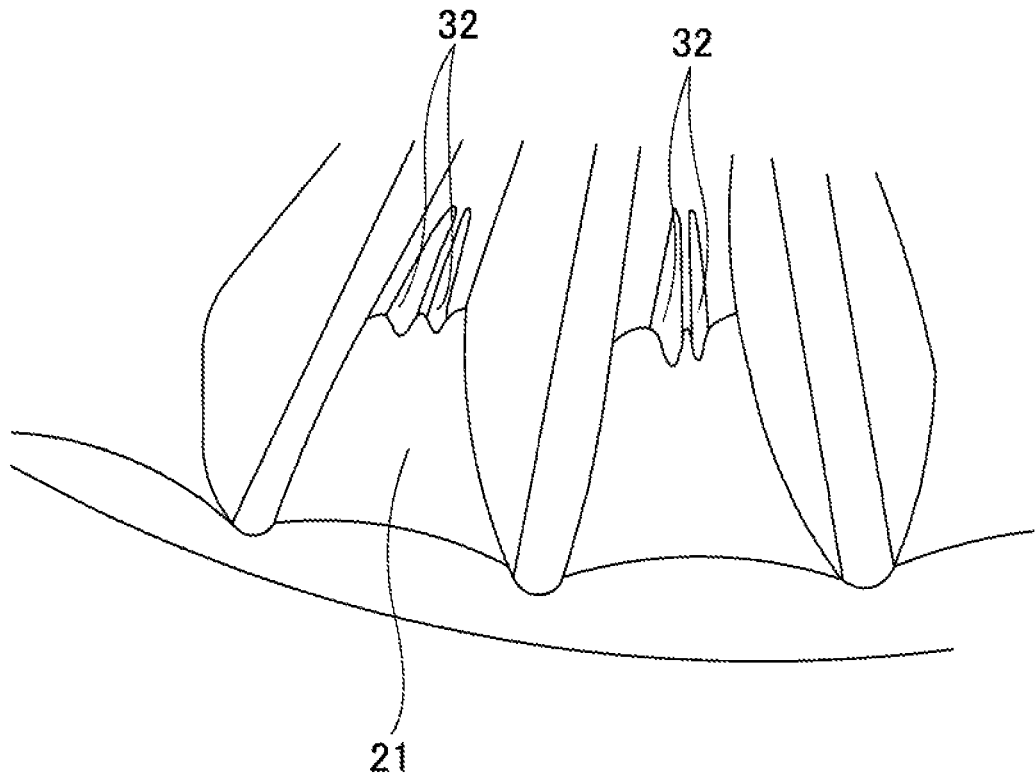
FIG. 7 is an enlarged perspective view of the main part of hub-side face splines, and is for explaining the problems in a conventional manufacturing method for a rolling bearing unit.

As a result, it is possible to prevent radial streaks 32 such as illustrated in FIG. 7 from being formed on the tip-end surfaces of each of the teeth of the hub-side face splines 21, and it is possible to prevent damage such as peeling from occurring on the other end surface in the axial direction of the crimped section 20. Therefore, when forming a wheel-drive bearing unit such as illustrated in FIG. 5 by combining a wheel-support rolling bearing unit 1 that was made according to the production method of this embodiment with a universal joint outer ring 2, it is possible to properly maintain an engaged state between the hub-side face splines 21 and the joint-side face splines 26, and to sufficiently maintain the life of the wheel-support rolling bearing unit 1.

Furthermore, the pitch $P_r$ in the circumferential direction of the teeth that are formed on the processing surface 31 and the pitch $P_h$ in the circumferential direction of the hub-side face splines 21 that are to be formed on the other end surface in the axial direction of the crimped section 20 are made to coincide by regulating the swing center distance L and the swing angle θ. Therefore, it is possible to form various shapes (number of teeth $N_h$, pitch circle diameter $D_h$) of hub-side face splines 21 by adjusting the swing center distance L and the swing angle θ without having to replace the roll 30.

In the manufacturing method for a rolling bearing unit of this embodiment, the pitch circle diameter $D_h$ of the hub-side face splines 21, the number $N_h$ of hub-side face splines 21, and the number $N_r$ of teeth formed on the processing surface 31 of the roll 30 are taken to be specified values, and the swing center distance L and the swing angle θ are regulated so that the relationship of Expression (1) is satisfied. However, in the present invention, the positional relationship between the main hub body 8 and the roll 30 can be set with other parameters taken to be specified values, and it is possible to regulate at least any one of the swing center distance L, the swing angle θ, and the pitch circle diameter $D_h$ of the hub-side face splines 21.

Second Example

A second example of an embodiment will be explained using FIG. 1 to FIG. 3. In this example, first, the swing angle θ that is the inclination angle of the center axis of the roll 30 with respect to the center axis of the main hub body 30 is set to an arbitrary value. After that, the relationship (see FIG. 3) of the swing center distance L, which is the distance between the intersecting point of the center axis of the main hub body 8 and the center axis of the roll 30 and an imaginary plane that includes the other end surface in the axial direction of the crimped section 20, and the difference ΔP ($=P_r-P_h$) between the pitch $P_r$ in the circumferential direction of the teeth that are formed on the processing surface 31 of the roll 30 and the pitch $P_h$ in the circumferential direction of the hub-side face splines 21 is found.

Figure 2:
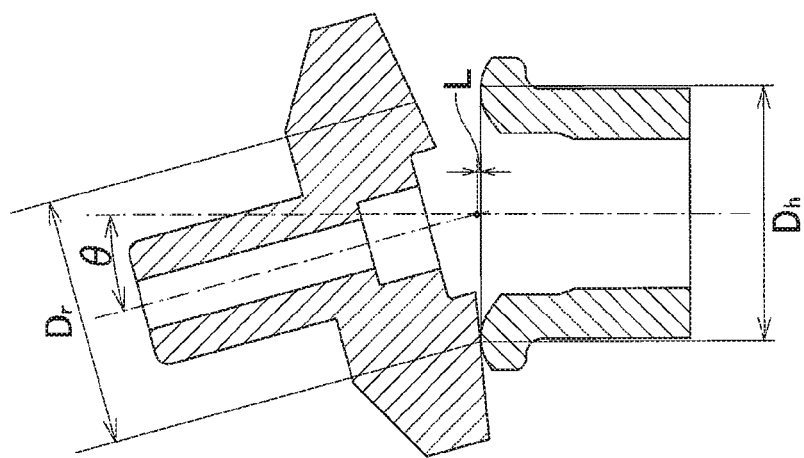
FIGS. 2A to 2C illustrate three examples of diagrams for finding the relationship of the swing center distance L, pitch circle diameter $D_r$ and pitch difference ΔP in a second example of an embodiment of the present invention.
Figure 2:
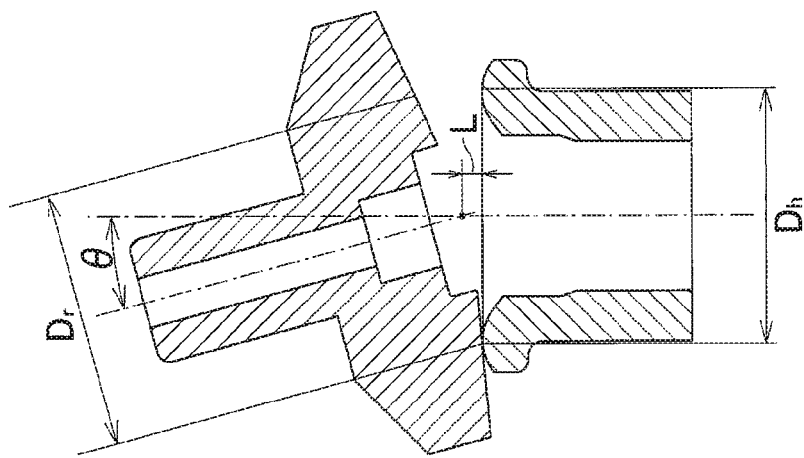
Figure 2:
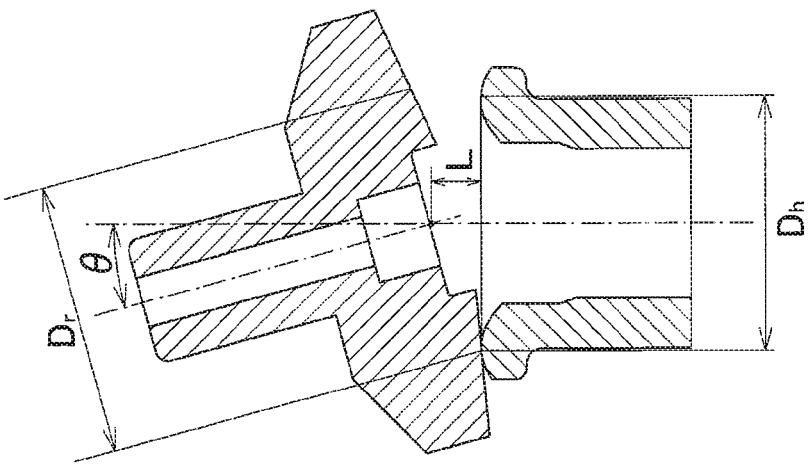
Figure 3:
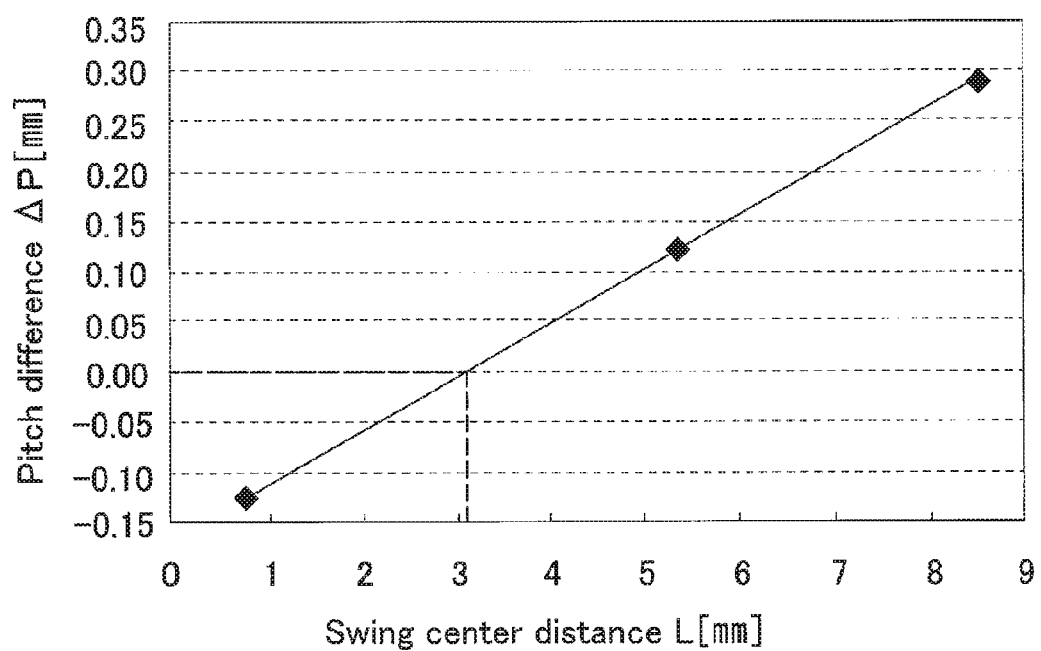
FIG. 3 is a graph illustrating the relationship between the swing center distance L and pitch difference ΔP in the second example of an embodiment of the present invention.

With the swing angle θ that is the inclination angle of the center axis of the roll 30 with respect to the center axis of the main hub body 8 fixed, a plurality of combinations (three in this example) of swing center distances L and pitch circle diameters $D_r$ of the teeth that are formed on the processing surface 31 of the roll 30 for giving a specified shape (number of teeth $N_h$, pitch circle diameter $D_h$) to the hub-side face splines 21 are found from diagrams such as illustrated in FIG. 2. Combinations of swing angle distance L, pitch circle diameters $D_h$, $D_r$ and number of teeth $N_h$, $N_r$ that were found in this way are given in the following Table 1.

TABLE 1

| | Swing Center Distance L [mm] | Number of Face Spline Teeth $N_h$ | Pitch Circle Diameter of the Face Splines $D_h$ [mm] | Number of Roll Teeth $N_r$ | Pitch Circle Diameter of the Roll $D_r$ [mm] |
|---|---|---|---|---|---|
| (A) | 8.5 | 31 | 85.2 | 30 | 91.0 |
| (B) | 5.3 | 31 | 85.2 | 30 | 87.6 |
| (C) | 0.8 | 31 | 85.2 | 30 | 82.8 |

The pitch difference ΔP is calculated by substituting the swing center distance L, pitch circle diameters $D_h$, $D_r$, and number of teeth $N_h$, $N_r$ into Expression (4). As illustrated in FIG. 3, a linear function relationship is established between the pitch difference ΔP and the swing center distance L. By finding from FIG. 3 the swing center distance L where the pitch difference ΔP becomes 0 (approximately 3.1 mm in the example in FIG. 3), it is possible to make the pitch $P_r$ in the circumferential direction of the teeth that are formed on the processing surface 31 of the roll 30 and the pitch $P_h$ in the circumferential direction of the hub-side face splines 21 when performing orbital forging. The construction and function of the other parts are the same as in the case of the first example of an embodiment.

Third Example

Figure 4:
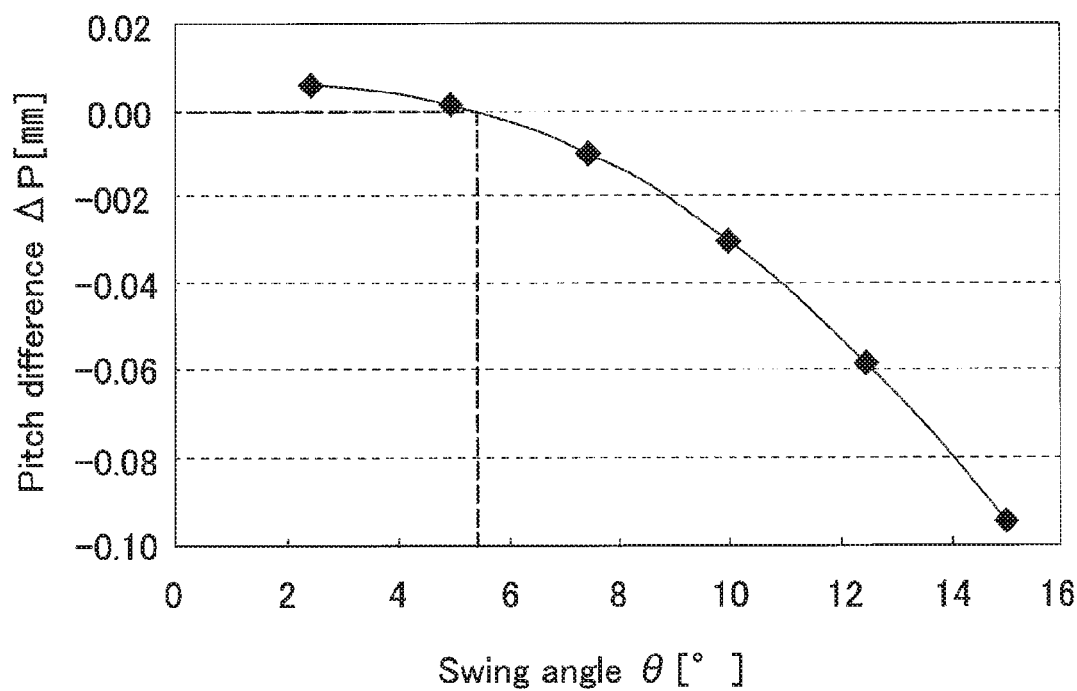
FIG. 4 is a graph illustrating the relationship between the swing angle θ and pitch difference ΔP in a third example of an embodiment of the present invention.

A third example of an embodiment will be explained using FIG. 1 and FIG. 4. In this example, first the swing center distance L that is the distance in the axial direction of the main hub body 8 between the intersecting point of the center axis of the main hub body 8 and the center axis of the roll 30 and an imaginary plane that includes the other end surface in the axial direction of the crimped section 20 is set to an arbitrary value. After that, the relationship (see FIG. 4) of the swing angle θ, which is the inclination angle of the center axis of the roll 30 with respect to the center axis of the main hub body 8, and the difference ΔP ($=P_r-P_h$) between the pitch $P_r$ in the circumferential direction of the teeth that are formed on the processing surface 31 of the roll 30 and the pitch $P_h$ in the circumferential direction of the hub-side face splines 21 is found. In other words, with the swing center distance L, which is the distance in the axial direction of the main hub body 8 between the intersecting point of the center axis of the main hub body 8 and the center axis of the roll 30 and an imaginary plane that includes the other end surface in the axial direction of the crimped section 20, fixed, a plurality of combinations (six in this example) of swing angles θ and pitch circle diameters $D_r$ of the teeth that are formed on the processing surface 31 of the roll 30 for giving a specified shape (number of teeth $N_h$, pitch circle diameter $D_h$) to the hub-side face splines 21 are found.

Next, the pitch difference ΔP is calculated by substituting the swing angle θ and pitch circle diameter $D_r$ into Expression (4). FIG. 4 illustrates the relationship of the pitch difference ΔP and the swing angle θ. By finding FIG. 4 the swing angle θ where the pitch difference ΔP becomes 0 (approximately 5.5 degrees in the example in FIG. 4), it is possible to make the pitch $P_r$ in the circumferential direction of the teeth that are formed on the processing surface 31 of the roll 30 and the pitch $P_h$ in the circumferential direction of the hub-side face splines 21 coincide. The construction and functions of the other parts are the same as those in the first example of an embodiment.

INDUSTRIAL APPLICABILITY

When embodying the present invention, from the aspect of obtaining hub-side face splines having a specified shape, preferably the pitch difference ΔP is made to be 0 by at least one of the swing angle θ and the swing center distance L of the roll as done in each of the examples of an embodiment. However, when it is not necessary to strictly regulate the shape of the hub-side face splines, the pitch difference ΔP can also be made to be 0 by adjusting the pitch circle diameter of the teeth of the hub-side face splines.

EXPLANATION OF REFERENCE NUMBERS

1 Wheel-support bearing unit
2 Universal joint outer ring
3 Outer ring
4 Hub
5 Rolling body
6 Stationary-side flange
7a, 7b Outer-ring raceway
8 Main hub body
9 Inner ring
10 Rotating-side flange
11a, 11b Inner-ring raceway
12 Small-diameter stepped section
13 Center hole
14 Small-diameter section
15 Bolt
16 Rod section
17 Male threaded section
18 Head section
19 Cylindrical section
20 Crimped section
21 Hub-side face splines
22 Mouth section
23 End wall section 24 Shaft section
25 Threaded hole
26 Joint-side face splines
27 Universal-joint inner ring
28 Ball
29a, 29b Retainer
30 Roll
31 Processing surface

The invention claimed is:

1. A manufacturing method for a rolling bearing unit that comprises:
   a main hub body and an inner ring;
   the main hub body having an inner-ring raceway on one side in the axial direction of the rolling bearing unit that is provided around an outer-circumferential surface of a middle section in the axial direction of the main hub body, a cylindrical section that is provided on a portion near the end on the other side in the axial direction of the main hub body, and a crimped section that is provided on an end section on the other side in the axial direction of the main hub body and extends outward in the radial direction from the end section on the other side in the axial direction of the cylindrical section;
   the inner ring having an inner-ring raceway on the other side in the axial direction around an outer-circumferential surface of the inner ring, and fitting around the cylindrical section; and
   the crimped section having a surface on the one end in the axial direction that constrains a surface on the other end in the axial direction of the inner ring, and a surface of the other end in the axial direction on which hub-side face splines are provided;
   the manufacturing method for a rolling bearing unit comprising;
   a step of forming the hub-side face splines on the surface of the other end in the axial direction of the crimped section by using a roll having a center axis that is inclined with respect to the center axis of the main hub body and a processing surface provided with plural teeth, and with the processing surface of the roll pressed against the surface of the other end in the axial direction of the crimped section, causing the roll to rotate around the center axis of the main hub body, and causing the roll to rotate around the center axis of the roll due to engagement between the processing surface of the roll and the surface of the other end in the axial direction of the crimped section;
   when causing the roll to rotate around the center axis of the main hub body with the processing surface of the roll pressed against the surface of the other end in the axial direction of the crimped section, spacing of the teeth that are formed on the processing surface at a location in the radial direction of a portion of the processing surface of the roll where the tip end of one of the teeth formed on the processing surface of the roll first comes in contact with the surface of the other end in the axial direction of the crimped section, and spacing of teeth of the hub-side face splines at a location in the radial direction of a portion of the surface of the other end in the axial direction of the crimped section where the surface of the other end in the axial direction of the crimped section first comes in contact with the tip end of the one of the teeth formed on the processing surface of the roll being made to coincide.

2. The manufacturing method for a rolling bearing unit according to claim 1, wherein
   in a state in which the processing surface of the roll is pressed against the surface of the other end in the axial direction of the crimped section, when
   a swing center distance that is the distance in the axial direction of the main hub body between an intersecting point of the center axis of the main hub body and the center axis of the roll and an imaginary plane that includes the surface of the other end in the axial direction of the crimped section is taken to be L;
   a swing angle that is the inclination angle of the center axis of the roll with respect to the center axis of the main hub unit is taken to be θ;
   a diameter of an imaginary circle the center of which is the center axis of the main hub body and the radius of which is the distance between the center axis of the main hub body and the location in the radial direction of the portion of the surface of the other end in the axial direction of the crimped section where the surface of the other end in the axial direction of the crimped section first comes in contact with the tip end of the one of the teeth formed on the processing surface of the roll is taken to be $D_h$;
   the number of teeth of the hub-side face splines is taken to be $N_h$; and
   the number of teeth formed on the processing surface of the roll is taken to be $N_r$;
   at least one of the swing center distance L, the swing angle θ, and the pitch circle diameter $D_h$ is regulated so that the relationship $$N_r/N_h = \cos\theta + (2L/D_h)\cdot\sin\theta$$

is satisfied.

3. The manufacturing method for a rolling bearing unit according to claim 1, wherein
   in a state in which the processing surface of the roll is pressed against the surface of the other end in the axial direction of the crimped section, after one of
   a swing center distance L that is the distance in the axial direction of the main hub body between an intersecting point of the center axis of the main hub body and the center axis of the roll and an imaginary plane that includes the surface of the other end in the axial direction of the crimped section, and
   a swing angle θ that is the inclination angle of the center axis of the roll with respect to the center axis of the main hub body
   has been set to an arbitrary value;
   a relationship between
   the value of the other of the swing center distance L and the swing angle θ, and
   the difference between the spacing of the teeth that are formed on the processing surface of the roll, and the spacing of the teeth of the hub-side face splines
   is found in order that specified values are employed for
   a pitch circle diameter $D_h$ of an imaginary circle the center of which is the center axis of the main hub body and the radius of which is the distance between the center axis of the main hub body and the location in the radial direction of the portion of the surface of the other end in the axial direction of the crimped section where the surface of the other end in the axial direction of the crimped section first comes in contact with the tip end of the one tooth of the teeth formed on the processing surface of the roll, and the number of teeth $N_h$ of the hub-side face splines, and from that relationship, the value of the other of the swing center distance L and the swing angle θ is set so that the difference is 0.

4. A rolling bearing unit comprising:

at least a main hub body and an inner ring; wherein the main hub body has an inner-ring raceway on one side in the axial direction of the rolling bearing unit that is provided around an outer-circumferential surface of a middle section in the axial direction of the main hub body, a cylindrical section that is provided on a portion near the end on the other side in the axial direction of the main hub body, and a crimped section that is provided on an end section on the other side in the axial direction of the main hub body and extends outward in the radial direction from the end section on the other side in the axial direction of the cylindrical section;

the inner ring has an inner-ring raceway around the outer-circumferential surface of the inner ring, and fits around the cylindrical section;

the crimped section has a surface on the one end in the axial direction that constrains a surface on the other end in the axial direction of the inner ring, and a surface of the other end in the axial direction on which hub-side face splines are provided; and radial streaks due to orbital forging for forming hub-side face splines are not formed in the tip-end surfaces of the teeth of the hub-side face splines.

* * * * *